US 6,663,031 B2

(12) United States Patent
Henderson et al.

(10) Patent No.: US 6,663,031 B2
(45) Date of Patent: Dec. 16, 2003

(54) SPICE GRINDING AND DISPENSING MILL

(75) Inventors: Scott Henderson, Brooklyn, NY (US); Allen Zadeh, Brooklyn, NY (US)

(73) Assignee: WKI Holding Company, Inc., Reston, VA (US)

(*) Notice: Subject to any disclaimer, the term of this patent is extended or adjusted under 35 U.S.C. 154(b) by 48 days.

(21) Appl. No.: 10/038,702

(22) Filed: Jan. 2, 2002

(65) Prior Publication Data

US 2002/0092941 A1 Jul. 18, 2002

Related U.S. Application Data

(60) Provisional application No. 60/261,424, filed on Jan. 12, 2001.

(51) Int. Cl.[7] ................................................ A47J 42/04
(52) U.S. Cl. ..................................................... 241/169.1
(58) Field of Search ............................ 222/142.1–142.9; 241/168–169.2

(56) References Cited

U.S. PATENT DOCUMENTS

| | | |
|---|---|---|
| 197,982 A | 12/1877 | Seifert et al. |
| 1,237,100 A | 8/1917 | Ross |
| 3,991,947 A | 11/1976 | Schlessel |
| 4,026,490 A | 5/1977 | Johansson |
| 4,135,672 A | 1/1979 | Schlessel |
| 4,139,161 A | 2/1979 | Hupperich |
| 4,280,666 A | 7/1981 | Jones |
| 4,340,095 A | 7/1982 | Dale et al. |
| D269,489 S | 6/1983 | Akita |
| 4,509,698 A | 4/1985 | David |
| 4,634,061 A | 1/1987 | Williams |
| 4,685,625 A | 8/1987 | Mazza |
| 4,765,549 A | 8/1988 | Sherman |
| 4,865,258 A | 9/1989 | Smith et al. |
| D309,241 S | 7/1990 | Ayyoubi et al. |
| 4,960,246 A | 10/1990 | Fohrman |
| 5,322,227 A | 6/1994 | Fiocchi |
| D378,653 S | 4/1997 | Richardi |
| 5,651,506 A | 7/1997 | Hockey |
| 5,865,384 A | 2/1999 | Pai |
| 6,056,217 A | 5/2000 | Friden |
| 6,550,640 B2 * | 4/2003 | Smith .......................... 222/1 |

* cited by examiner

Primary Examiner—Mark Rosenbaum
(74) Attorney, Agent, or Firm—Seyfarth Shaw LLP

(57) ABSTRACT

A spice grinding mill has a spice-containing jar with a collar on its neck carrying a frangible freshness seal which is removable to open the container. A grinding assembly is removably mountable on the container and has one or more manually operable latches engageable with keeper structure on the collar to releasably hold the grinding assembly in place, while permitting rotation of the outer portion of the grinding assembly relative to the container, which outer portion is covered with an elastomeric material for improved grip. A plastic cap is removably mountable on the collar or on the outlet of the grinding assembly.

11 Claims, 10 Drawing Sheets

SPICE GRINDING AND DISPENSING MILL

RELATED APPLICATION

This application claims the benefit of the filing date of copending U.S. Provisional Application No. 60/261,424, filed Jan. 12, 2001.

BACKGROUND

This application discloses a device for containing and grinding products and dispensing the ground products and, more particularly, a device for grinding spices in pellet or kernel form to a powder or granular form and simultaneously dispensing the ground spices.

Prior spice or condiment grinding mills are known which include a grinding assembly detachably mountable on a container for the product to be ground. In such prior arrangements, the grinding assembly is typically threadedly connected to the top of the container. Since, in use, the grinding assembly or parts thereof are designed to be rotated relative to the container to effect the grinding operation, the grinding assembly can accidentally become unscrewed from or loosened with respect to the container, in use.

It is also known to provide a cap with the grinding assembly to protect it from dirt, moisture and the like, when not in use. However, there is typically no provision for closing or reclosing the condiment container when it is separated from the grinding assembly.

Finally, many prior condiment grinding mills are difficult to use for persons with impaired grip, such as the elderly or persons suffering from arthritis or the like, since they provide gripping surfaces which can be slippery, particularly in the presence of moisture.

SUMMARY

There is described in this application a grinding and dispensing apparatus which avoids the disadvantages of prior devices while affording additional structural and operating advantages.

An important aspect is the provision of a grinder dispenser with a grinding assembly which is easily mountable and demountable on an associated container of product to be ground by a latching arrangement which is not adversely affected by operation of the device in use.

Another aspect is the provision of a grinder dispenser of the type set forth which provides for closure of the container when the grinding assembly is separated therefrom.

Still another aspect is the provision of a grinder dispenser of the type set forth which is of improved ergonomic design to facilitate use by persons with impaired grip.

Certain ones of these and other aspects may be attained by providing a grinder dispenser comprising: a container for product to be ground and having an access port, a grinding assembly having an inlet for receiving product to be ground and an outlet for dispensing ground product, the grinding assembly being releasably mountable on the container in a use condition with the inlet communicating with the access port, latch structure on one of the container and the grinding assembly, and keeper structure on another of the container and the grinding assembly, the latch structure being releasably engageable with the keeper structure for retaining the grinding assembly in its use condition.

Other aspects may be attained by providing a grinder dispenser of the type set forth, which includes a frangible seal on a container normally closing the access port.

Still other aspects may be attained by providing a grinder dispenser of the type set forth with a cap which can be removably mountable on either the grinding assembly or the container.

Other aspects may be attained by providing a grinder dispenser of the type set forth which includes an elastomeric cover on the grinding assembly to facilitate gripping by a user.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 4:
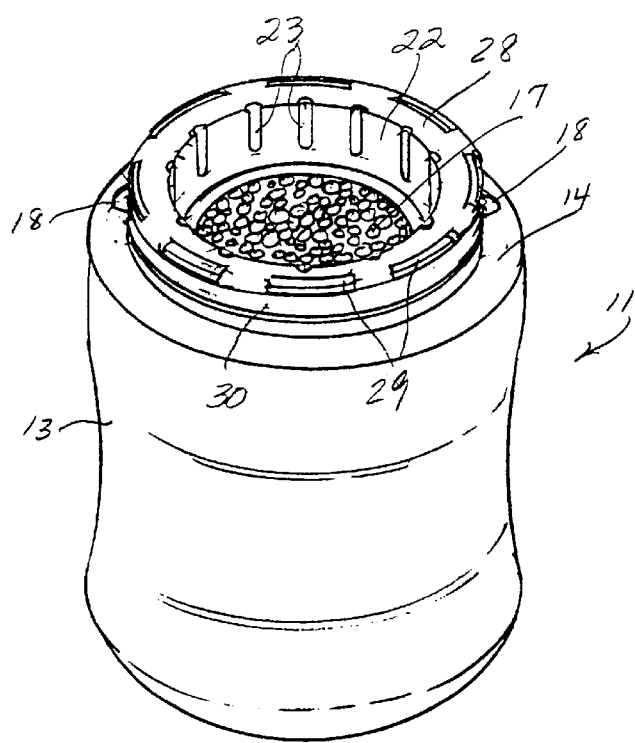
FIG. 4 is a top perspective view of the container of FIG. 1 with the grinding assembly and the freshness seal membrane removed.

Referring to FIGS. 1–4, there is illustrated a grinder dispenser in the form of a spice grinding mill, generally designated by the numeral 10, which includes a container 11 in the nature of an open-top jar for containing a supply of spice pellets 17 (FIG. 4). As shown, the container 11 is formed of glass, but it may be formed of any suitable material and may be transparent or translucent to permit viewing of the contents thereof. The container 11 has a bottom wall 12 and a generally cylindrical side wall 13, integral at the upper end thereof with an inturned shoulder 14 which is, in turn, integral with an upstanding and outwardly flared neck 15 terminating in a radially outwardly projecting lip 16. Lugs 18 project laterally outwardly from the container 11 at the junction between the shoulder 14 and the neck 15 at equiangularly spaced-apart locations.

Figure 5:
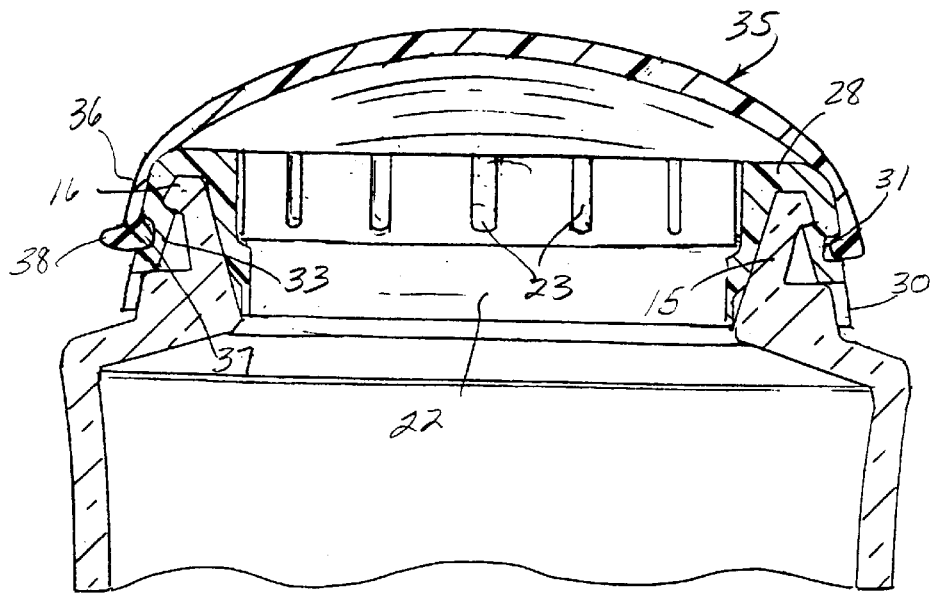
FIG. 5 is a fragmentary sectional view of the container of the mill of FIG. 2, with the grinding assembly and the seal membrane removed and with the cap mounted thereon.
Figure 6:
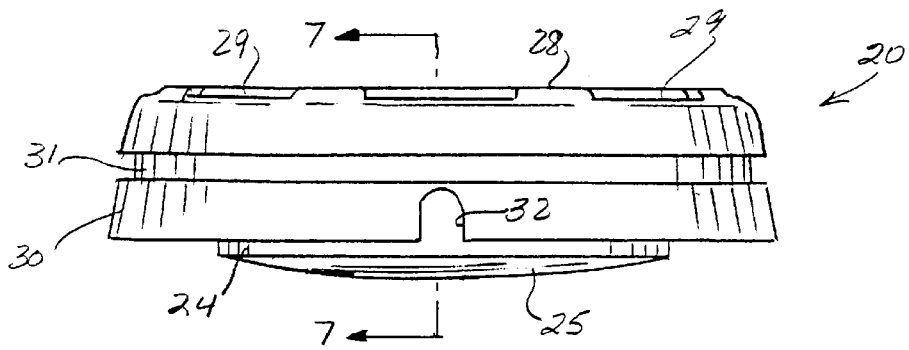
FIG. 6 is a side elevational view of the seal of the mill of FIG. 2.
Figure 7:
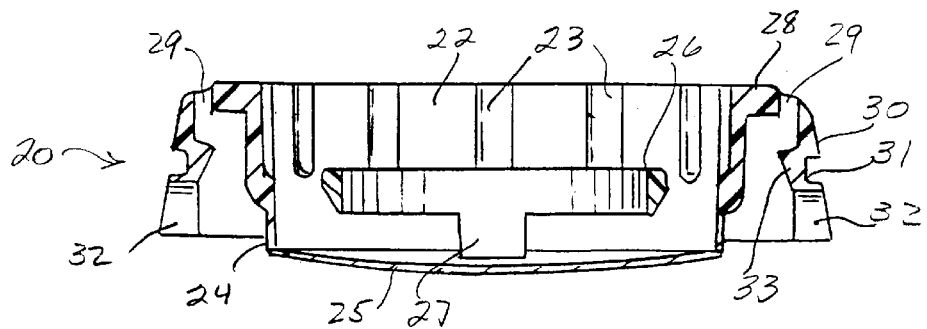
FIG. 7 is a sectional view taken along the line 7—7 in FIG. 6.

Referring also to FIGS. 6 and 7, the spice grinding mill 10 includes a freshness seal 20 in the nature of an annular collar which may be formed of one piece, as by molding, of any suitable material, such as a suitable plastic. The seal 20 has a cylindrical inner side wall 22 provided with a plurality of equiangularly spaced-apart, generally axially extending grooves 23 on the inner surface thereof. The lower or inner end of the side wall 22 is provided with a lip 24 closed along a peripheral frangible joint by a generally circular frangible seal membrane 25, which may be unitarily connected to a pull ring 26 by a hinge tab 27. The opposite end of the inner side wall 22 is joined by an annular top wall 28 to a depending outer side wall 30, which may diverge slightly from the inner side wall 22. Circumferentially spaced slots 29 may be formed in the top wall 28. A circumferential groove 31 is formed in the outer surface of the outer side wall 30 and diametrically spaced notches 32 may be formed at the distal end edge thereof. An annular ridge 33 projects laterally inwardly from the side wall 30 at the level of the groove 31. In use, the seal 20 is snap-fitted onto the neck 15 of the container 11 to form an access port thereof. More specifically, the neck 15 is received between the inner and outer side walls 22 and 30, with the annular ridge 33 snapping beneath the annular lip 16 of the neck 15, as can best be seen in FIGS. 2 and 5. The seal 20 is rotationally oriented so that the lugs 18 of the container 11 are respectively received in the notches 32 of the seal to prevent relative rotation thereof.

In use, the seal 20 is installed in place after the container 11 has been filled and, once installed, protects the contents of the container 11 and preserves its freshness.

Referring to FIG. 5, the spice grinding mill 10 includes a generally circular, dome-shaped cap 35 which may be formed of a suitable plastic material and has a generally frustoconical side wall 36 terminating at its distal end in a radially inwardly projecting bead 37. A short tab 38 extends radially outwardly from the side wall 36 adjacent to its distal edge. In use, the cap 35 may be snap-fitted over the seal 20, with the bead 37 snapping into the annular groove 31. When it is desired to open the container 11, the cap 35 is removed by grasping and lifting the tab 38, exposing the seal 20.

Figure 14:
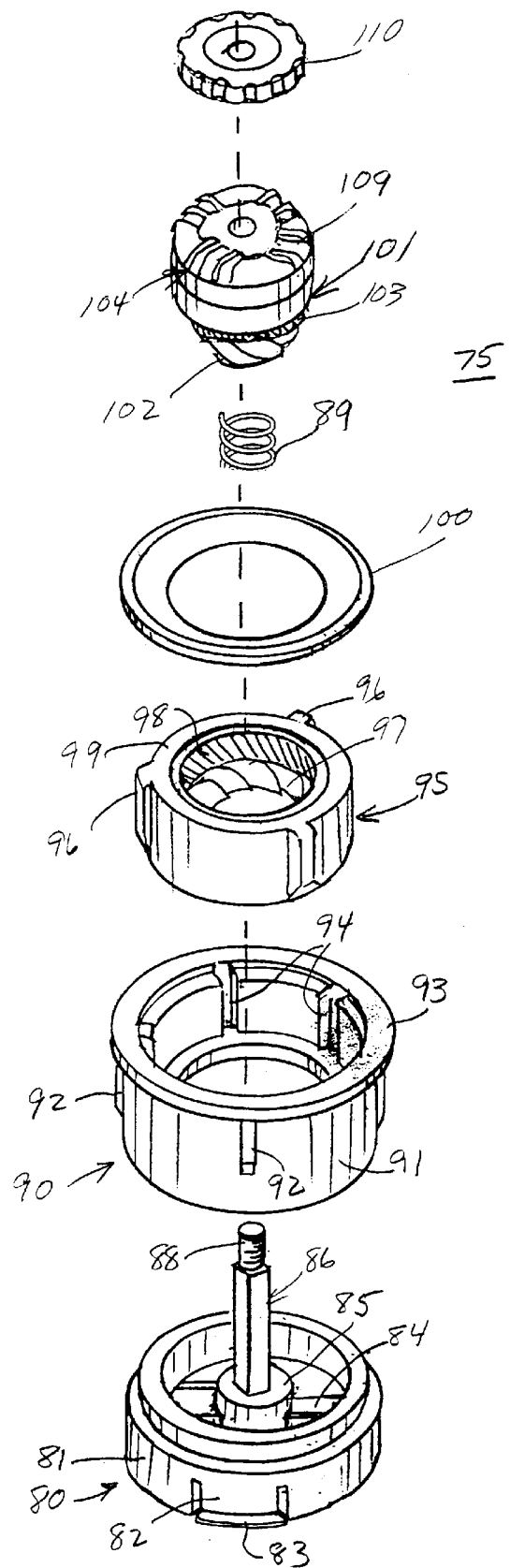
FIG. 14 is a reduced exploded perspective view of the grinding mechanism of the grinding assembly of FIG. 8.

Referring to FIGS. 1, 2, 8 and 9, the spice grinding mill 10 includes a grinding assembly, generally designated by the numeral 40, which is removably mountable on the container 11. The grinding assembly 40 includes an outer housing 41 in which is mounted a grinding mechanism 75. The grinding mechanism 75 may be an assembly of the type manufactured by Ideas Denmark under Model No. KAM-03XM and is generally illustrated in FIG. 14, but some of the details of construction and assembly thereof will not be discussed herein, since they are ancillary to the subject matter sought to be protected.

Figure 2:
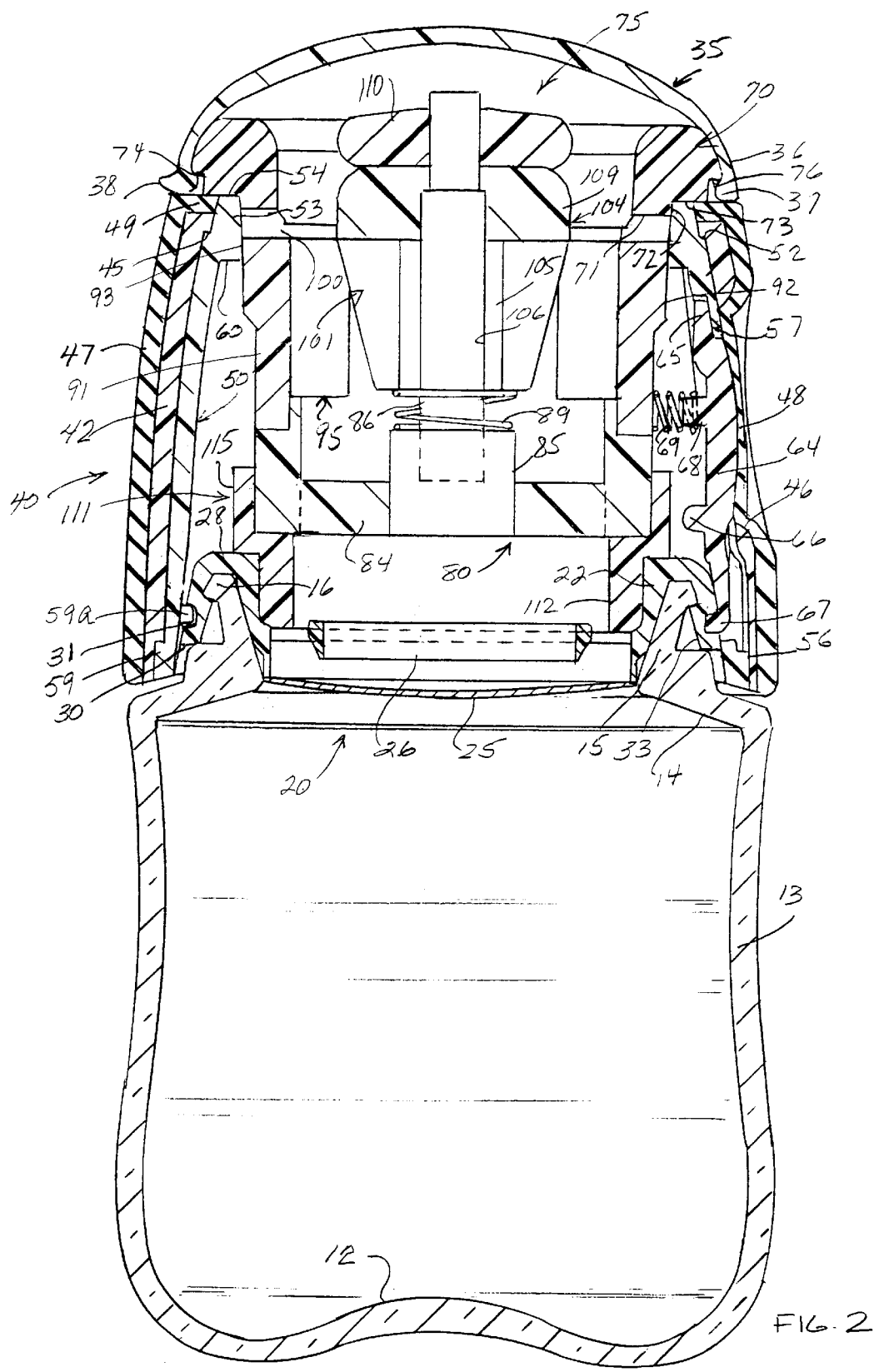
FIG. 2 is an enlarged sectional view taken generally along the line 2—2 in FIG. 1, but with the grinding mechanism diagrammatically illustrated.
Figure 3:
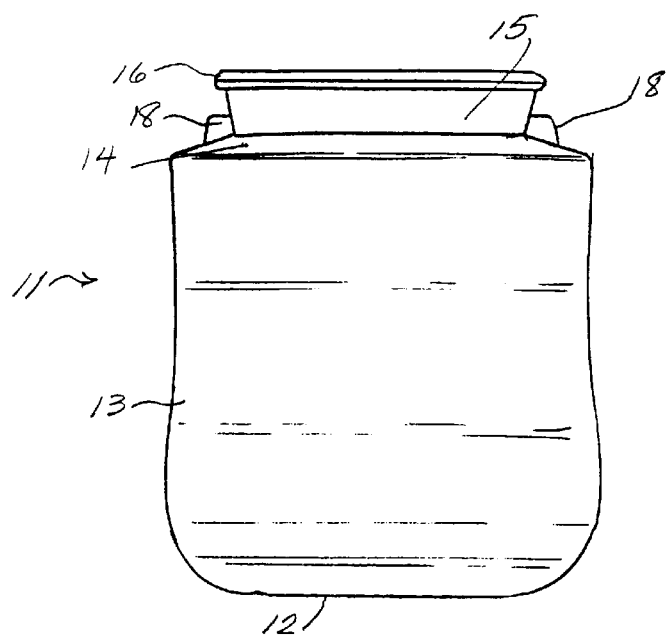
FIG. 3 is a reduced front elevational view of the container of the mill of FIG. 2 with the seal collar removed.
Figure 8:
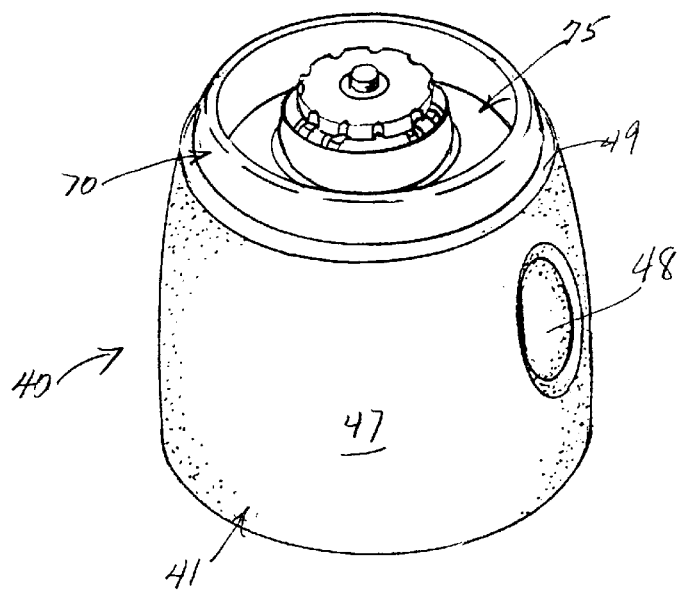
FIG. 8 is a top perspective view of the grinding assembly of the mill of FIG. 1 with the cap removed.
Figure 9:
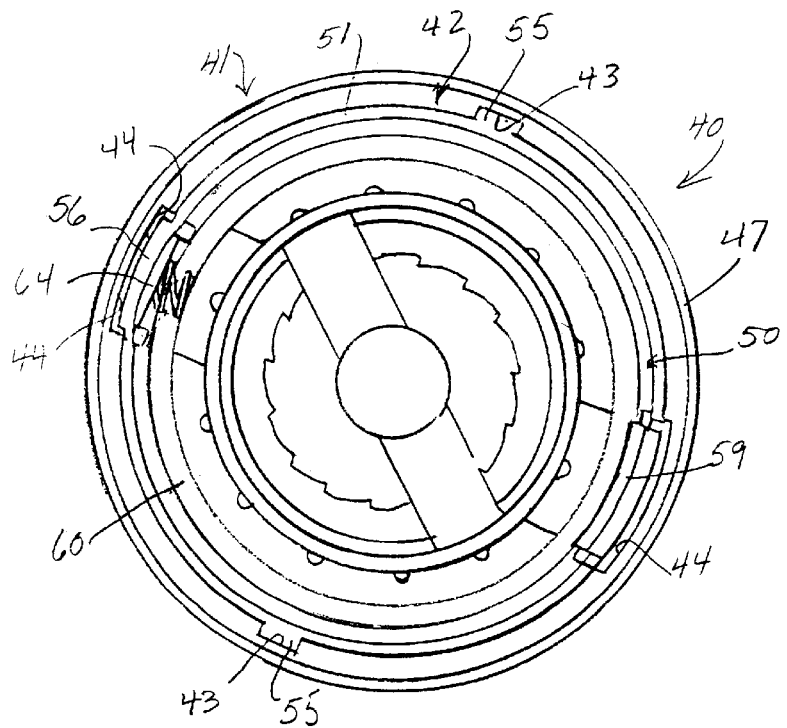
FIG. 9 is an enlarged bottom plan view of the grinding assembly of FIG. 8.
Figure 10:
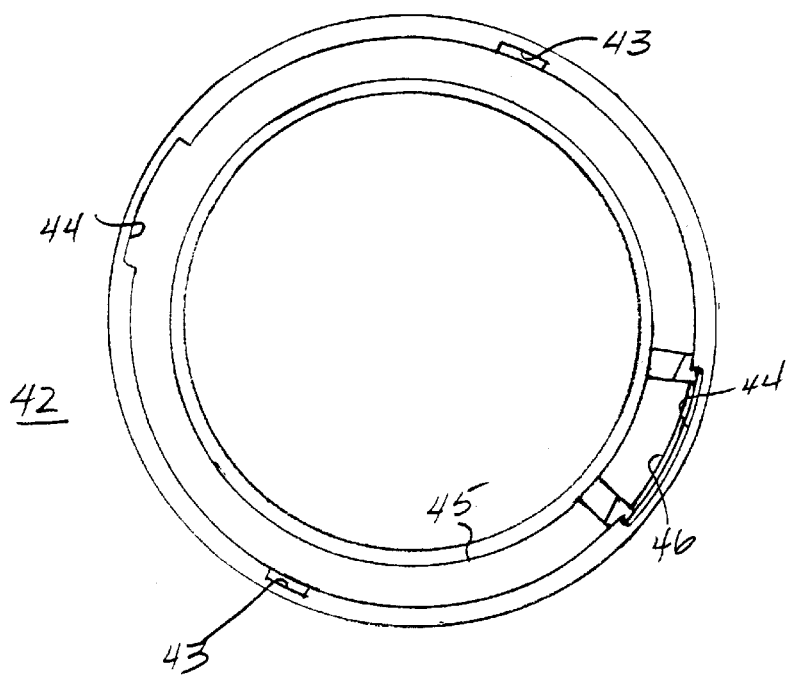
FIG. 10 is a bottom plan view of the outer shell of the grinding assembly FIG. 9.

Referring to FIGS. 2, 9 and 10, the outer housing 41 includes an outer shell 42 (FIG. 10) which may be of molded, unitary, one-piece construction and formed of a suitable plastic material and generally cylindrical in shape. The shell 42 has two diametrically opposed narrow recesses 43 and two diametrically opposed relatively wide recesses 44 formed in the inner surface thereof adjacent to one end thereof. The other end of the outer shell 42 is provided with a radially inwardly projecting annular lip 45. Formed through the outer shell 42 intermediate the ends thereof is a relatively large oblong opening 46. The entire outer surface of the outer shell 42 is overmolded with a grip 47 (FIG. 2) formed of a flexible and resilient frictional material, which may be a suitable elastomer, such as that sold under the trademark SANTOPRENE. The grip 47 has a portion 48 covering the opening 46 and a portion 49 covering the lip 45 (FIGS. 2 and 8).

Figure 11:
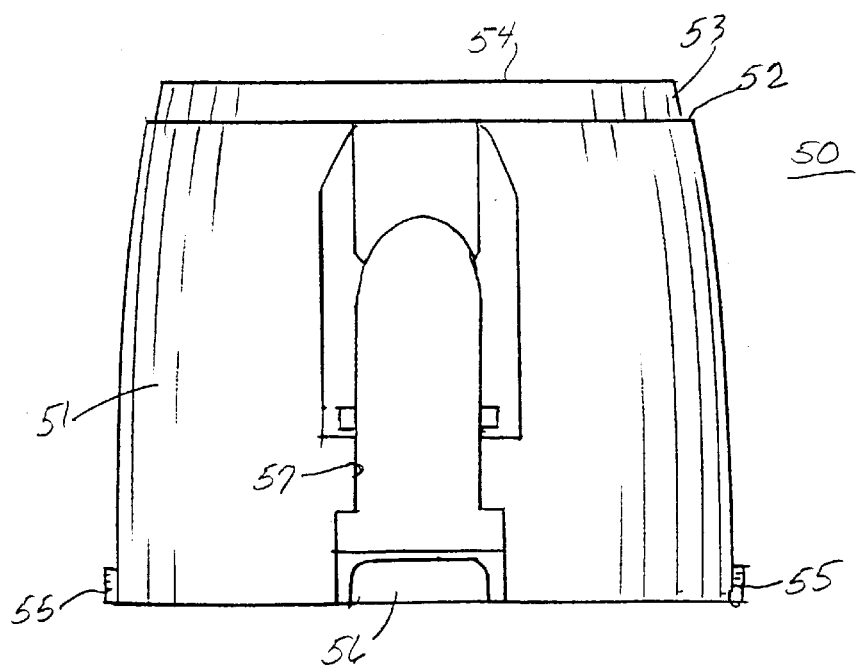
FIG. 11 is a front elevational view of the release frame of the grinding assembly of FIG. 9.
Figure 12:
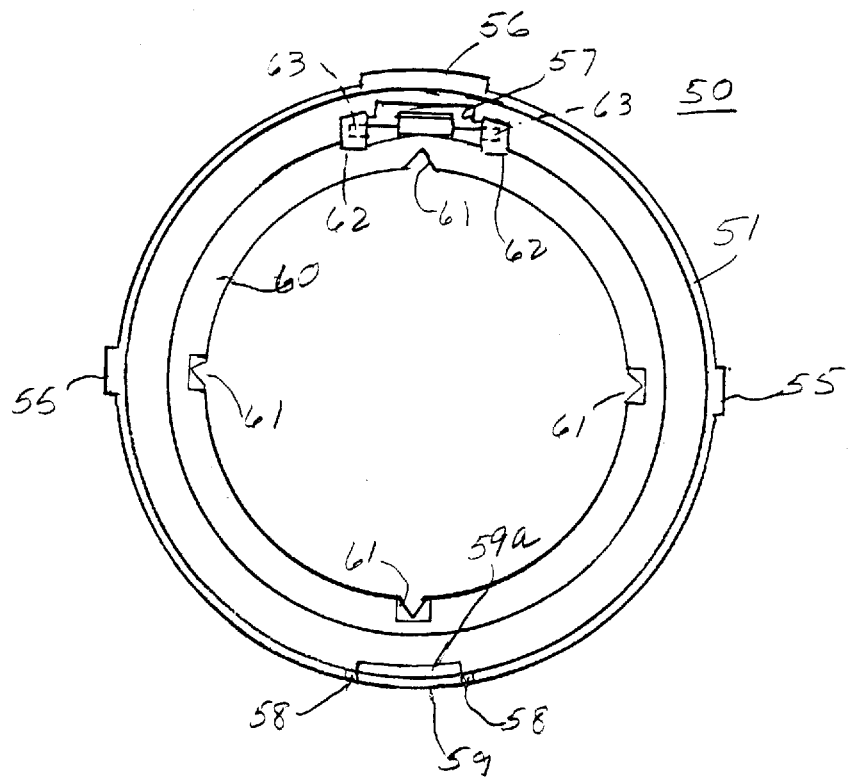
FIG. 12 is a bottom plan view of the release frame of FIG. 11.

Referring also to FIGS. 11 and 12, there is disposed along the inside of the outer shell 42 a release frame 50, which may be of molded, unitary, one-piece construction and formed of a suitable plastic material. The release frame 50 has a generally cylindrical side wall 51, the outer surface of which has an annular, laterally inwardly projecting shoulder 52 adjacent to one end thereof joined to a short generally cylindrical neck 53, which terminates in an annular end surface 54. Projecting radially outwardly from the side wall 51 at the other end thereof are two diametrically opposed narrow lugs 55 and a relatively wide lug 56. Formed through the side wall 51 immediately above the lug 56 is an elongated, irregularly-shaped aperture 57. Diametrically opposite the lug 56 are a pair of circumferentially spaced, axially extending notches 58 formed in the adjacent end of the side wall 51 for forming a generally rectangular tab 59, having at the distal end thereof a radially inwardly extending flange 59a. At the inner end of the neck 53, an annular flange 60 projects radially inwardly and is provided at four equiangularly spaced-apart locations thereon with generally V-shaped notches 61 (FIG. 12). Projecting laterally inwardly from the side wall 51 along opposite sides of the aperture 57 are two ribs 62. Formed in the outer surface of the side wall 51 on opposite sides of the aperture 57 are socket recesses 63.

Figure 13:
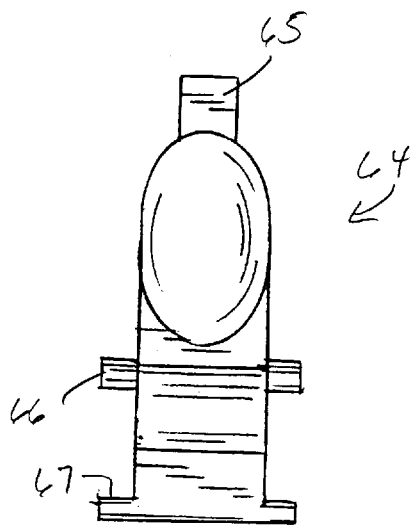
FIG. 13 is a reduced front elevational view of the latch paddle of the mill of FIG. 2.

A latch paddle 64 (FIGS. 2, 9 and 13), which may be formed of a suitable plastic material, is shaped similarly to and disposed in the aperture 57 and is provided at its upper end with a lip 65 which is disposed along the inner surface of the release frame 50 above the top edge of the aperture 57. Formed along the inner surface of the latch paddle 64 is a generally cylindrical pivot pin 66, the opposite ends of which are respectively received in the socket recesses 63 for defining a pivot axis. Extending laterally inwardly from the latch paddle 64 at its lower end is a latch lip 67. Projecting laterally inwardly from the latch paddle 64 intermediate the lip 65 and the pivot pin 66 is a short cylindrical lug 68 (FIG. 2) which fits inside one end of a helical compression spring 69 for seating the spring.

In assembly, the release frame 50 is fitted inside the outer shell 42 until the shoulder 52 abuts the lip 45 (see FIG. 2), the parts being rotationally oriented so that the lugs 55 are respectively received in the narrow recesses 43, and the lug 56 and tab 59 are respectively received in the wide recesses 44, thereby effectively preventing relative rotation of the parts. In this assembled condition, the end surface 54 of the neck 53 will be substantially flush with the outer surface of the portion 49 of the grip 47 which covers the lip 45, and the main body of the latch paddle 64 will be disposed in the aperture 57 and the opening 46 and against the opening cover portion 48 of the grip 47, as can best be seen in FIG. 2.

Referring to FIGS. 2 and 8, there is provided a lock ring 70, which may be formed of a suitable plastic material. The lock ring 70 has a stepped inner end with a radially inner annular surface 71 which meets at its outer edge with a short cylindrical shoulder 72, which in turn meets at its upper end with an annular surface 73, which in turn meets at its outer edge with a cylindrical shoulder 74, which in turn meets at its upper edge with an annular lip 76. In assembly, the lock ring 70 is fitted over the upper end of the outer housing 41, as shown in FIG. 2, with the shoulder 72 abutting the inner surface of the release frame neck 53, and with the annular surface 73 overlying the release frame end surface 54 and the inner edge of the adjacent portion 49 of the grip 47.

Referring now to FIGS. 2 and 14, the grinding mechanism 75 includes a base 80 having a generally cylindrical side wall 81 provided at its lower end with circumferentially spaced flexible tabs 82 (one shown), each having a laterally outwardly projecting latch lip 83. Extending diametrically across the side wall 81 is a cross arm 84 defining, centrally thereof, a cylindrical hub 85. The base 80 may be molded in a unitary, one-piece construction of a suitable plastic material. An elongated metal spindle 86, substantially polygonal in transverse cross section, has one end fixed to the hub 85 coaxially therewith, the distal end of the spindle 86 being externally threaded, as at 88. A helical compression spring 89 encircles the spindle 86 and seats against the hub 85.

The grinding mechanism 75 also includes an outer collar 90 having a substantially cylindrical wall 91 provided adjacent to one end with a plurality of radially outwardly projecting equiangularly spaced-apart lugs 92. Integral with that end of the wall 91 is a radially outwardly extending annular flange 93. Formed along the inner surface of the wall 91 are a plurality of equiangularly spaced and axially extending grooves 94. The grinding mechanism 75 also includes an outer grind ring 95, which may be formed of a ceramic material and is provided with a plurality of equiangularly-spaced, radially outwardly projecting ribs 96, dimensioned to be respectively received in grooves 94 of the outer collar 90 for preventing relative rotation of the parts. The grind ring 95 has formed on its inner surface a plurality of generally helical, coarse grinding vanes 97 adjacent to one end thereof and a plurality of generally helical, fine grinding vanes 98 adjacent to the opposite end thereof, which latter end defines an annular end surface 99. A retaining ring 100 is dimensioned to overlie the annular end surface 99 of the outer grind ring 95.

The grinding mechanism 75 also has a grinding cone 101, which may be formed of a ceramic material and has a cylindrical opening extending axially therethrough. Formed on the outer surface of the grinding cone 101 are a plurality of generally helical, coarse grinding vanes 102 at the narrow end thereof and a plurality of generally helical, fine grinding vanes 103 at the wide end thereof. A ratchet mechanism 104 has a cylindrical hub 105 (FIG. 2) which fits in the bore through the grinding cone 101, the hub 105 having formed axially therethrough a polygonal opening 106 dimensioned for mateably receiving the polygonal spindle 86. The ratchet mechanism 104 has an enlarged-diameter cap 109 which abuts the wide end of the grinding cone 101 and includes therein a suitable ratchet assembly cooperating with the grinding cone 101 to permit relative rotation of the parts in only one direction. The distal end of the hub 105 may project a slight distance beyond the narrow end of the grinding cone 101 and be encircled by a suitable retaining ring (not shown) over which the end of the hub 105 may be deformed in a suitable manner to retain the ratchet mechanism assembled to the grinding cone 101.

In assembly, the base 80 is fitted inside one end of the outer collar 90 and may be provided with a suitable annular shoulder to limit depth of insertion. The outer grind ring 95 is inserted in the other end of the outer collar 90 as explained above, and the spring 89 is fitted over the spindle 86. The pre-assembled grinding cone 101 and ratchet mechanism 104 are then fitted over the spindle 86, so that the polygonal spindle engages the polygonal bore 106 in the ratchet mechanism hub 105 so that the two will rotate together. The distal end of the hub 105 bottoms on the spring 89, which resiliently urges it axially outwardly. An adjusting nut 110 is threadedly engaged with the threaded portion 88 of the spindle 86 and can be screwed down thereon for depressing the grinding cone 101 against the spring 89 to change the spacing between the grinding cone 101 and the outer grind ring 95 to adjust the coarseness of the grinding. It will be appreciated that the coarse and fine grinding vanes 97, 98 of the outer grind ring 95 respectively cooperate with the coarse and fine grinding vanes 102 and 103 of the grinding cone 101 to progressively more finely grind spice pellets in a known manner. The retaining ring 100 cooperates with the lock ring 70 for retaining the grinding mechanism 75 in assembled condition with the outer housing 41 in a manner to be described more fully below.

Figure 15:
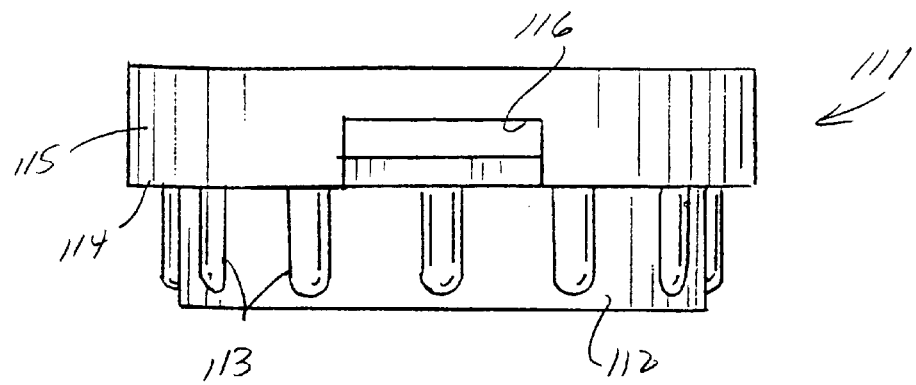
FIG. 15 is a front elevational view of the interlock ring of the mill of FIG. 2.
Figure 16:
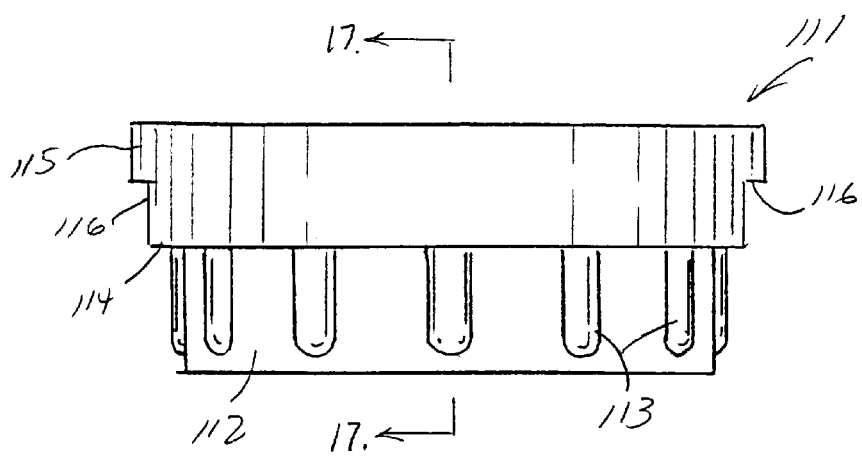
FIG. 16 is a left side elevational view of the interlock ring of FIG. 15.
Figure 17:
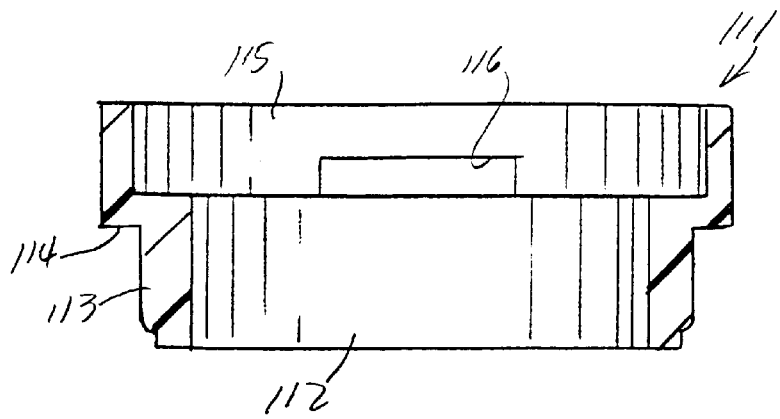
FIG. 17 is a sectional view taken along the line 17—17 in FIG. 16.

Referring also to FIGS. 15–17, there is provided an interlock ring 111 having a generally cylindrical wall 112 provided with a plurality of equiangularly spaced and radially outwardly projecting ribs 113. Extending laterally outwardly from the cylindrical wall 112 at one end thereof is an annular shoulder 114, integral at its outer edge with a cylindrical flange 115 coaxial with the cylindrical wall 112. A pair of diametrically opposed latch slots 116 are formed through the interlock ring 111 at the junction between the cylindrical wall 112 and the cylindrical flange 115. The interlock ring 111 is fitted over the base 80 of the grinding mechanism 75 so that the cylindrical side wall 81 of the base 80 is received within the cylindrical flange 115 of the interlock ring 111. During this insertion, the latch tabs 82 flex to allow the latch lips 83 to cam past the edge of the cylindrical flange 115, and when the end of the side wall 81 bottoms on the shoulder 114, the latch lips 83 snap into the latch slots 116 for retaining the parts together so that they rotate as a unit.

In assembly of the grinding assembly 40, the base 80 is first assembled to the interlock ring 111 in the manner described above. In this regard, there may be radially inwardly projecting ribs (not shown) on the interlock ring 111 receivable in complementary grooves in the outer surface of the base 80 to assist in aligning the parts rotationally. Then the outer collar 90 is fitted into the upper end of the outer housing 41, with the lugs 92 received in the V-shaped notches 61, and with the flange 93 bottoming on the flange 60. When the outer collar 90 is inserted in the outer housing 41, the spring 69 of the latch paddle 64 seats against the outer surface of the cylindrical wall 91. Then the base 80 of the grinding mechanism 75 may be fitted up through the opposite end of the outer housing 41, spindle first, until the upper end of the base 80 is fitted inside the lower end of the outer collar 90, as described above. In this regard, a circumferential bead (not shown) on the base 80 may snap fit into a circumferential groove (not shown) in the outer collar cylindrical wall 91 to retain the parts together while permitting relative rotation of the base 80 with respect to the outer collar 90. The outer grind ring 95 is then dropped into the outer collar 90, with the ribs 96 received in the grooves 94. Then the retaining ring 100 is fitted over the outer grind ring 95. Finally, the lock ring 70 is fitted over the top of the outer housing 41, as described above, and the annular surface 73 is ultrasonically welded to the end surface 54 of the release frame 50 to secure the assembly together. Alternatively, the assembled base 80 and interlock ring 111 may be assembled together with the outer collar 90 and then fitted in the release frame 50 together with the latch paddle 64 before the release frame 50 is fitted in the outer housing 41.

As thus assembled, the base 80, its spindle 86 and the attached interlock ring 111 will rotate as a unit relative to the outer housing 41 and the outer grind ring 95. Then the grinding cone 101 may be fitted over the spindle 86, as explained above, and retained in place with the adjusting nut 110 so that the grinding cone 101 will also then rotate with the spindle 86.

Figure 1:
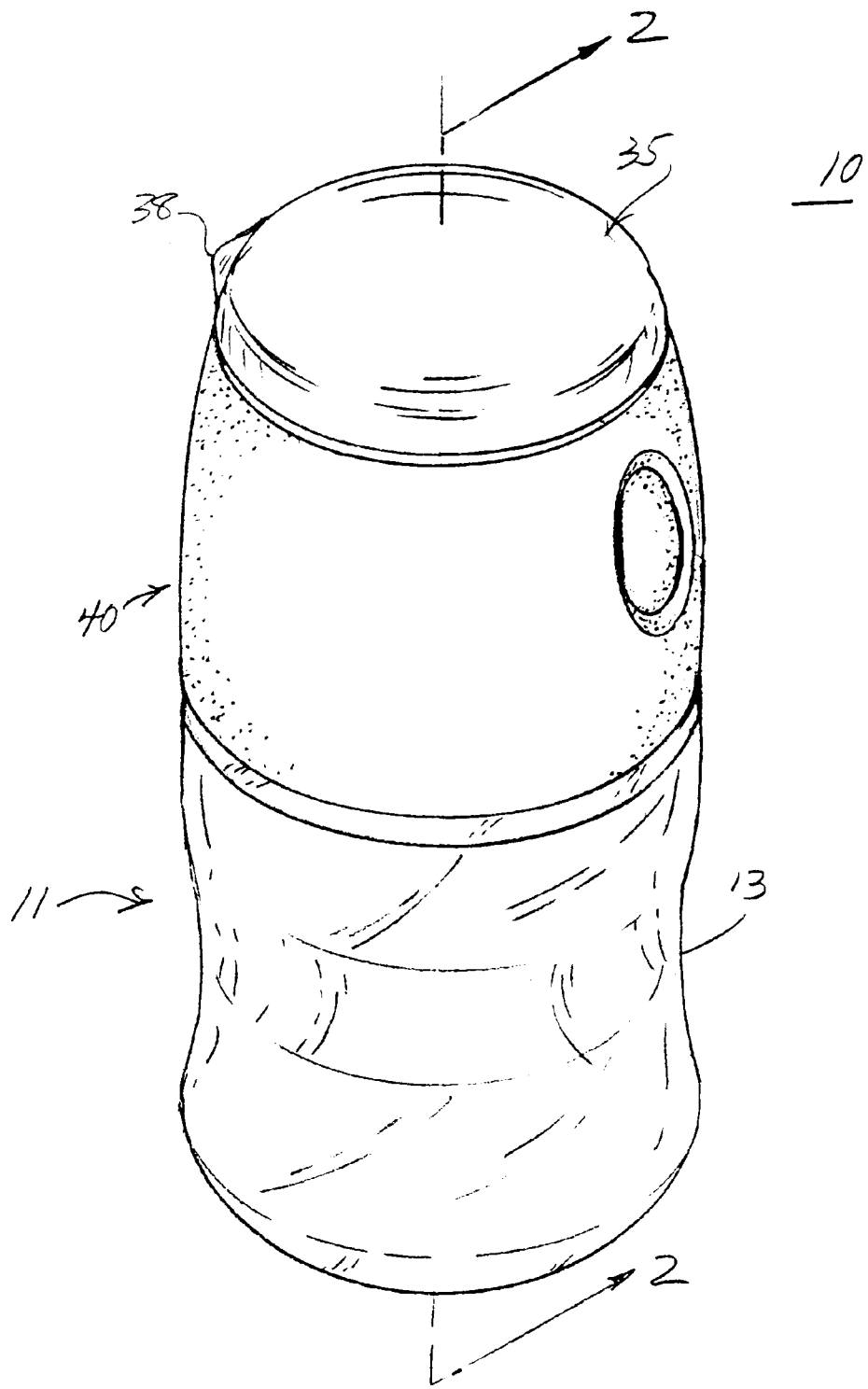
FIG. 1 is a perspective view of an embodiment of a spice grinding mill.

The thus-assembled grinding assembly 40 may then be snap-fitted onto the container 11 in a use condition shown in FIGS. 1 and 2. More specifically, the lower end of the outer housing 41 fits over the seal 20. In this regard, the tab 59 will flex to allow the flange 59a to cam past the upper part of the seal 20 and the lower end of the latch paddle 64 will pivot about the axis of the pivot pin 66 against the urging of the bias spring 69 to allow the latch lip 67 to cam past the upper part of the seal 20, until the flange 59a and the latch lip 67 snap into engagement in the annular groove 31, which serves as a keeper for the latch. As the grinding assembly 40 is thus installed on the container 11, the cylindrical wall 112 of the interlock ring 111 will fit down inside the inner side wall 22 of the seal 20 (see FIG. 2), with the ribs 113 being respectively received in the grooves 23, thereby locking the base 80 of the grinding mechanism 75 against rotation relative to the seal 20 and the container 11. The cap 35 may be snap fitted over the lock ring 70 of the grinding assembly 40, with the bead 37 snap fitting beneath the lip 76 of the lock ring 70, as can best be seen in FIGS. 1 and 2.

The spice grinding mill 10 may be sold in a condition illustrated in FIG. 2 with the container 11 filled with spice pellets or kernels, with the unbroken freshness seal 20 in place, and with the grinding assembly 40 mounted on the seal 20 and the cap 35 in place on the top of the grinding assembly 40. When it is desired to use the mill 10 for the first time, the container 11 must first be unsealed. Thus, the grinding assembly 40 is first removed from the container 11. In order to unlatch it, the user presses on the opening cover portion 48 of the grip 47, depressing the upper end of the latch paddle 64 and pivoting it to release the latch lip 67 from engagement with the annular groove 31. This permits the grinding assembly 40 to be tilted back to disengage the tab flange 59a from the groove 31 to remove the grinding assembly 40. Then the pull ring 26 is grasped and pulled upwardly, tearing the seal membrane 25 from the lip 24 of the inner side wall 22, all in a known manner, to define an access opening into the container 11. Then, the grinding assembly 40 is reinstalled on the container 11 and the mill 10 is ready for use.

In use, the cap 35 is removed from the grinding assembly 40, and the spice grinding mill 10 is inverted to allow the contents of the container 11 to flow up inside the base 80, which defines an inlet to the grinding assembly 40, and into the gap between the outer grind ring 95 and the grinding cone 101, which cooperate to define an outlet from the grinding assembly. Then the container 11 is grasped with one hand and the grip 47 of the grinding assembly 40 is grasped with the other hand and the two are rotated relative to each other to thereby rotate the outer grind ring 95 relative to the grinding cone 101 to grind the spice pellets or kernels. This rotation is permitted in only one direction because of the ratchet mechanism 104. After use, the cap 35 may be reinstalled on the grinding assembly 40 or, alternatively, if it is desired to store the grinding assembly 40 separately from the container 11, the grinding assembly 40 may be again detached from the container 11 and the cap 35 installed directly on the seal 20 of the container 11, as in FIG. 5.

The container 11 may also be sold separately from the grinding assembly 40. In this case, the container 11 would typically be filled with product to be ground, with the freshness seal 20 and cap 35 in place. Thus, when the contents of the container 11 are exhausted, the user may either refill the exhausted container with bulk product or simply discard it and purchase a new filled container.

Figure 18:
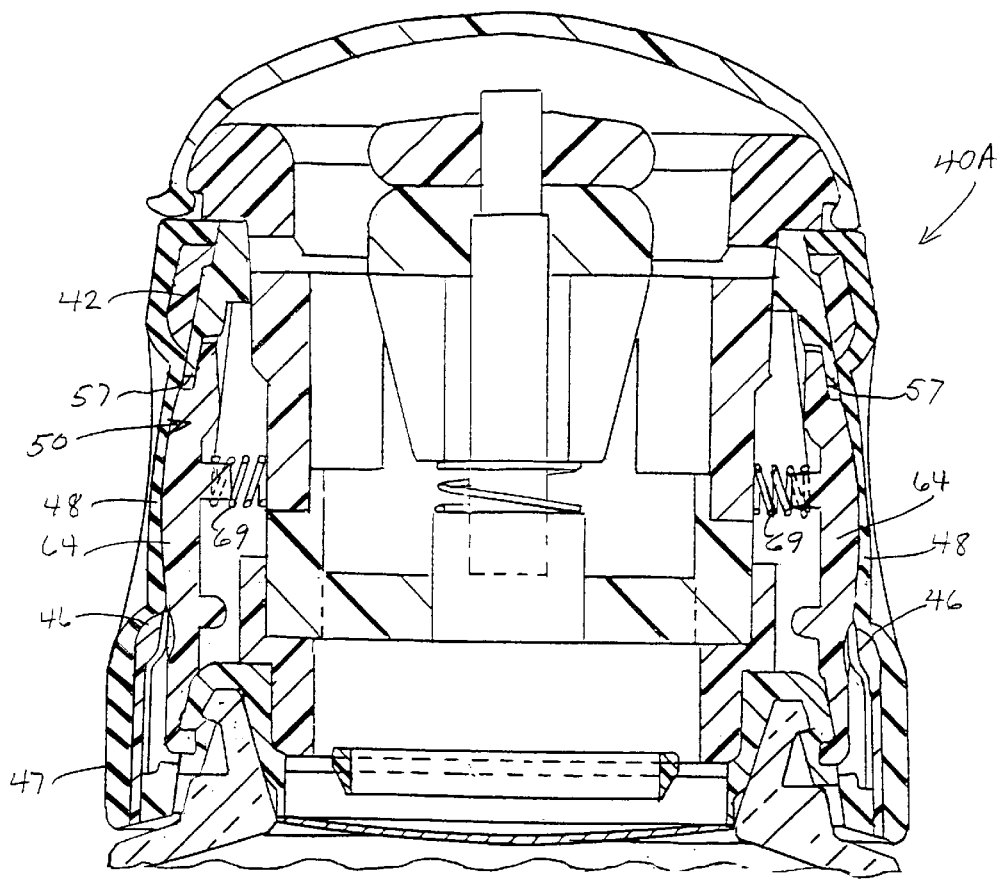
FIG. 18 is an enlarged, fragmentary, sectional view similar to the upper portion of FIG. 2 and illustrating an alternative embodiment.
Figure 19:
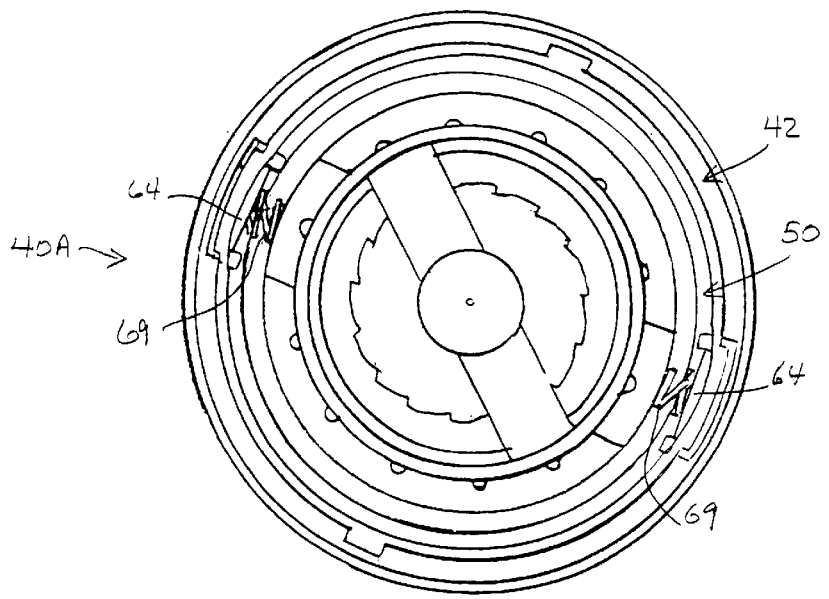
FIG. 19 is a view similar to FIG. 9 illustrating the embodiment of FIG. 18.

Referring now to FIGS. 18 and 19, there is illustrated an alternative embodiment of the grinding assembly, designated 40A, which is substantially identical to the grinding assembly 40 described above, except that in lieu of the latching tab 59 and flange 59a, the assembly is provided with two of the latch paddles 64, respectively disposed at diametrically opposed locations. Accordingly, it will be appreciated that the outer shell 42 is provided with two of the openings 46 and the release frame 50 is provided with two of the apertures 57 for accommodating the two latch paddles 64, and the grip 47 has two of the portions 48 covering the openings 46. Accordingly, the same reference numerals are used for both. This arrangement facilitates mounting and removal of the grinding assembly 40 with respect to the container 11, permitting the user to depress both latch paddles 64 simultaneously, as with the thumb and forefinger of one hand, permitting the grinding assembly to be mounted and demounted in a purely axial movement, without any tilting.

While the mill 10 is described as a spice grinding mill, it will be appreciated that the principles described above are applicable to the grinding and dispensing of other types of materials, which might be provided in granular, pellet or bean-like form. Also, the materials described above for the various parts of the mill 10 are merely illustrative and it will be appreciated that other types of materials could be used.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A grinder dispenser comprising:

a container for product to be ground and having an access port, a grinding assembly having an inlet for receiving product to be ground and an outlet for dispensing ground product, the grinding assembly being releasably mountable on the container in a use condition with the inlet communicating with the access port, latch structure on one of the container and the grinding assembly, and keeper structure on another of the container and the grinding assembly, the latch structure being releasably engageable with the keeper structure for retaining the grinding assembly in its use condition.

2. The grinder dispenser of claim 1, wherein the latch structure is on the grinding assembly and the keeper structure is on the container.

3. The grinder dispenser of claim 1, wherein the grinding assembly includes an outer portion rotatable relative to the container when the grinding assembly is in its use condition.

4. The grinder dispenser of claim 3, and further comprising an elastomeric cover on the outer portion to facilitate gripping by a user.

5. The grinder dispenser of claim 3, wherein the keeper structure includes a circumferential groove encircling the access port, the latch structure being engageable in the circumferential groove and movable circumferentially therealong.

6. The grinder dispenser of claim 5, and further comprising a cap having a retaining rib snap-engageable in the circumferential groove to retain the cap in a covering position closing the access port when the grinding assembly is not mounted on the container.

7. The grinder dispenser of claim 1, wherein the latch structure includes plural latch fingers.

8. The grinder dispenser of claim 7, wherein at least one of the latch fingers is manually operable by a user between latching and unlatching positions.

9. The grinder dispenser of claim 7, wherein each of diametrically opposed latch fingers is manually operable by a user between latching and unlatching positions.

10. The grinder dispenser of claim 1, and further comprising a frangible seal on the container normally closing the access port, the seal having a handle portion to facilitate removal of the seal to open the access port.

11. The grinder dispenser of claim 1, and further comprising a cap removably mountable on the container for closing the access port and on the grinding assembly for closing the outlet.

* * * * *